US010151849B2

(12) United States Patent
Malik et al.

(10) Patent No.: US 10,151,849 B2
(45) Date of Patent: Dec. 11, 2018

(54) WELL PLACEMENT USING CLOSURE STRESS BASED LANDING MAP

(71) Applicant: Chevron U.S.A. Inc., San Ramon, CA (US)

(72) Inventors: Mayank Malik, Houston, TX (US); John DeSantis, Houston, TX (US); Fuju Chen, Houston, TX (US); Li Jiang, Houston, TX (US); Saijin Huang, Houston, TX (US); John A. Best, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 334 days.

(21) Appl. No.: 14/748,737

(22) Filed: Jun. 24, 2015

(65) Prior Publication Data

US 2016/0377754 A1  Dec. 29, 2016

(51) Int. Cl.
*G01V 1/40* (2006.01)

(52) U.S. Cl.
CPC ..................... *G01V 1/40* (2013.01)

(58) Field of Classification Search
None
See application file for complete search history.

(56) References Cited

U.S. PATENT DOCUMENTS

2011/0182144 A1* 7/2011 Gray .................. G01V 1/50
                                                  367/75
2013/0289962 A1* 10/2013 Wendt .................. G01V 1/28
                                                  703/10

OTHER PUBLICATIONS

Close, D., et al.; "Integrated Workflows for Shale Gas and Case Study Results for the Horn River Basin", British Columbia, Canada, May 2012, The Leading Edge, pp. 556-569.

Goodway, Bill, et al.; "Improved AVO Fluid Detection and Lithology Discrimination Using Lame Petrophysical Parameters; "$\lambda\rho$", "$\mu\rho$", & "$\lambda/\mu$ Fluid Stack", From P and S Inversions"; Nov. 1997 SEG Annual Meeting, pp. 183-186.

Goodway, Bill, et al.; "Seismic Petrophysics and Isotropic-Anisotropic AVO Methods for Unconventional Gas Exploration"; Dec. 2010, The Leading Edge, pp. 1500-1508.

Hampson, Dan, et al.; "Simultaneous Inversion of Pre-Stack Seismic Data"; 2005 CSEG National Convention, Evolving Geophysics Through Innovation, pp. 1-4.

(Continued)

*Primary Examiner* — Charles Garber
*Assistant Examiner* — Alia Sabur
(74) *Attorney, Agent, or Firm* — Mary R. Bram; Marie L. Clapp; Melissa M. Hayworth

(57) ABSTRACT

Desirable completion zones can be identified using closure stress in combination with one or more other attributes such as porosity. One computer-based well placement method includes using the computer to: process a seismic data volume to map the spatial distribution of a seismic-based CSS attribute; acquire logs from one or more boreholes in the subsurface region; derive from the logs a relationship between CSS and a minimum in-situ stress; apply the relationship to the CSS attribute map to produce a landing map that highlights desirable completion zones; and place one or more wells in the desirable completion zones. The borehole logs may include direct measurements of minimum in-situ stress (acquired via microfracture testing), sonic tool measurements of P-wave and S-wave velocity, and density tool measurements of bulk formation density.

14 Claims, 4 Drawing Sheets

(56) References Cited

OTHER PUBLICATIONS

Hunt, Lee, et al.; "Causal Fracture Prediction: Curvature, Stress, and Geomechanics"; Nov. 2011, The Leading Edge, pp. 1274-1286.
Malik, Mayank, et al.; "Microfracturing in Tight Rocks: A Delaware Basin Case Study"; 2014, SPE 169009-MS, pp. 1-13.
Refunjol, Xavier E., et al.; "Integration of Hydraulically Induced Microseismic Event Locations with Active Seismic Attributes: A North Texas Barnett Shale Case Study"; Geophysics, vol. 77, No. 3, May-Jun. 2012, pp. KS1-KS12.

* cited by examiner

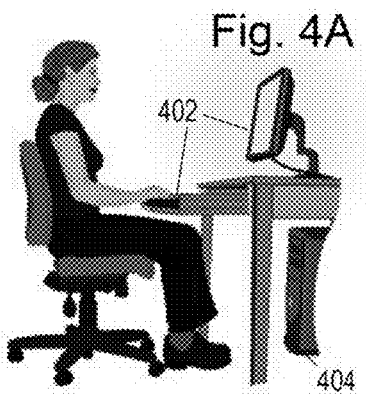
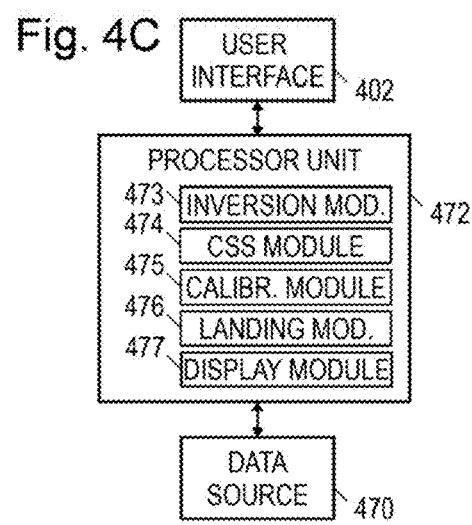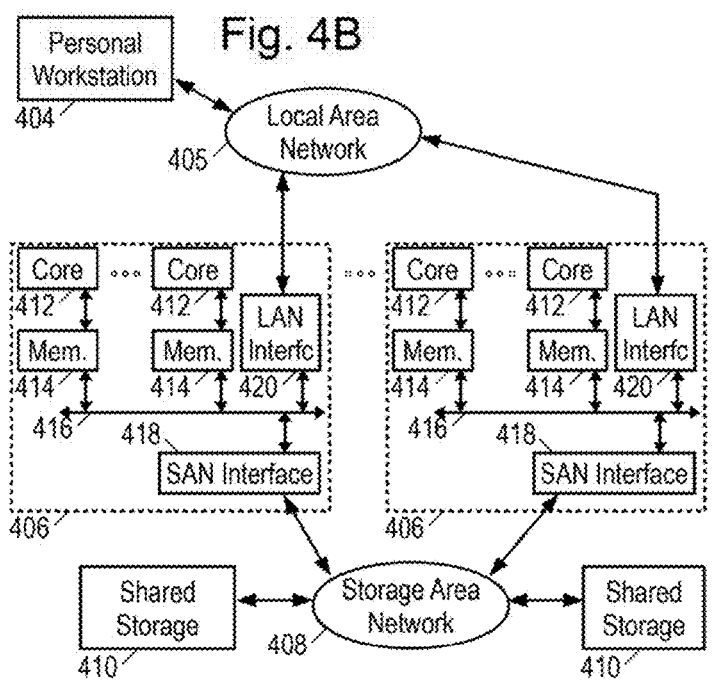

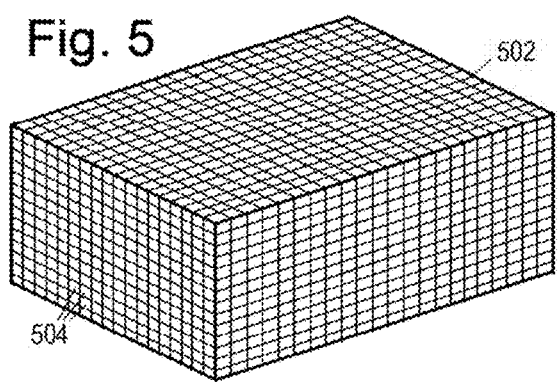
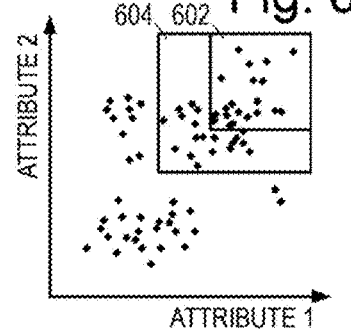
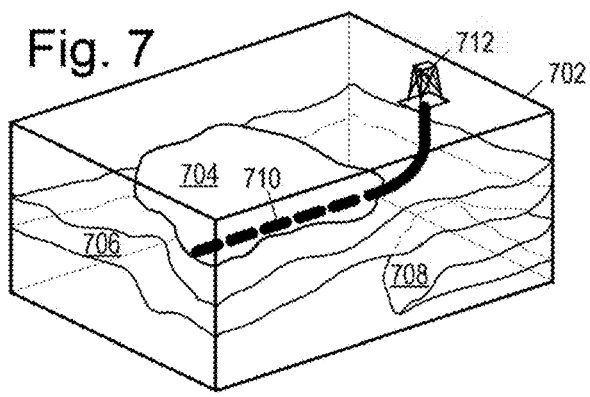

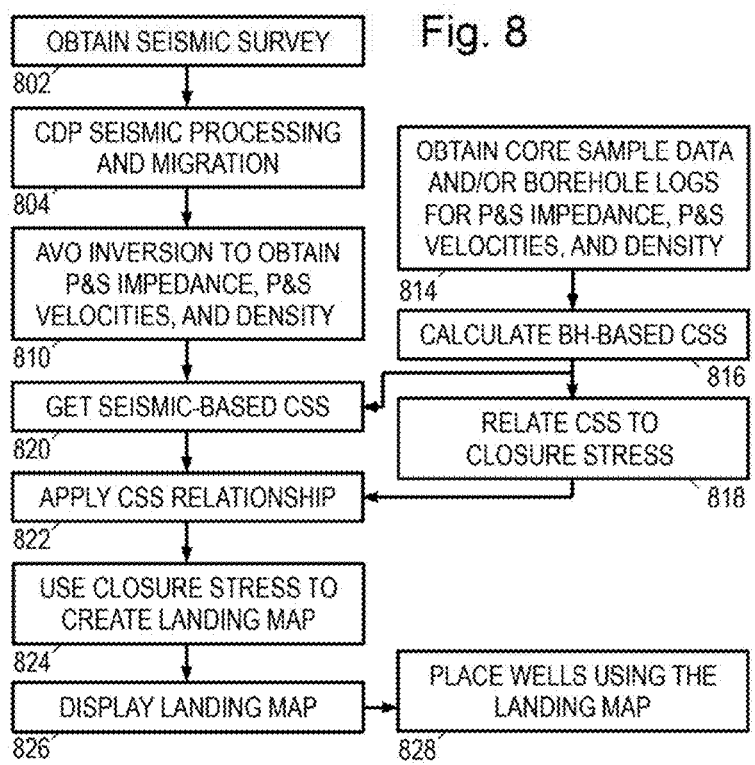
Fig. 8
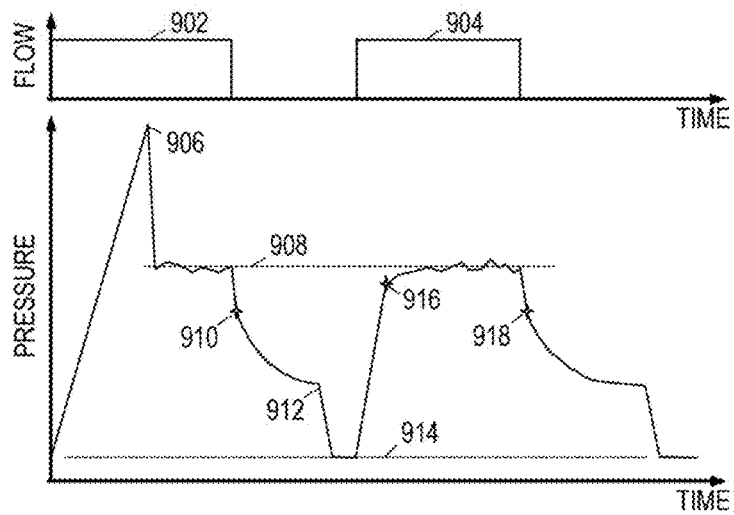
Fig. 9A
Fig. 9B

WELL PLACEMENT USING CLOSURE STRESS BASED LANDING MAP

BACKGROUND

To improve efficiency and maximize returns, explorationists and developers of hydrocarbon and mineral reservoirs collect enormous amounts of information regarding subsurface characterization. Such information is often cast in the form of a model having two or three spatial dimensions to demonstrate the spatial dependence of the relevant subsurface formation properties, i.e., a map. The framework of the model is typically derived from seismic survey data having relatively limited vertical resolution (when compared to well log data). Moreover the seismic survey data is more representative of relative rock properties than of the absolute properties themselves. In other words, processed seismic surveys readily reveal the overall structure and stratigraphy of the subsurface, but nevertheless still require substantial interpretation to select profitable completion zones. Such selection needs to be done as reliably as possible due to the considerable costs associated with drilling and completing each well.

BRIEF SUMMARY

Accordingly, there are disclosed herein well placement systems and methods using landing maps that are based in part on direct measurements of closure stress such as those obtainable with microfracture testing. In an embodiment, a computer-based well placement method comprises: (a) accessing a seismic survey of a subsurface region with a computer; (b) processing the seismic survey with the computer to get an attribute map of the subsurface region, wherein the attribute map represents at least a spatial distribution of a seismic-based closure stress scalar (CSS); (c) using the computer to access logs from one or more boreholes in the subsurface region, the logs including at least microfracture testing and sonic logs; (d) deriving from the logs a relationship between a borehole-based CSS and a minimum in-situ stress; (e) applying the relationship to the attribute map with the computer to produce a landing map that highlights desirable completion zones; and (f) using the landing map to place one or more wells in the desirable completion zones.

One computer-based well placement method integrates various complementary data sets, using the computer to: obtain a seismic survey of a subsurface region; process the seismic survey to map the spatial distribution of a seismic-based CSS attribute; acquire logs from one or more boreholes in the subsurface region, including at least sonic logs and microfracture test based measurements of in-situ closure stress; derive from the logs a relationship between CSS and closure stress; apply the relationship to the CSS attribute map to produce a calibrated CSS map; select a landing zone(s) from the map where attribute values highlight desirable completion zones; and place one or more wells in the desirable completion zones.

An illustrative system embodiment includes: a memory having a software module; and one or more processors coupled to the memory to execute the software module. The software module causes the one or more processors to perform a well placement method that includes: getting a CSS attribute map of the subsurface region; deriving from logs acquired in one or more boreholes in the subsurface region a relationship between CSS and a directly-measured closure stress; applying the relationship to the CSS attribute map to produce a landing map that highlights desirable completion zones; and determining placements for one or more wells in the desirable completion zones. The software module may further cause the one or more processors to display a visual representation of the landing map with said well placements.

BRIEF DESCRIPTION OF THE DRAWINGS

In the accompanying drawing sheets:

FIG. 4A shows a seismic interpreter employing an illustrative modeling system.

FIG. 4B is a block diagram of an illustrative hardware platform suitable for generating a landing map.

FIG. 4C is a block diagram of a modular software architecture.

FIG. 5 is an isometric view of a data space representing a subsurface region of interest.

FIG. 6 is an illustrative cross-plot having certain regions selected for highlighting.

FIG. 7 is a perspective view of an illustrative landing map.

FIG. 8 is a flow diagram of an illustrative well placement method.

FIG. 9A is a graph of an illustrative injection flow rate during a microfracture test.

FIG. 9B is a graph of an illustrative pressure profile from a microfracture test.

Figure 1:
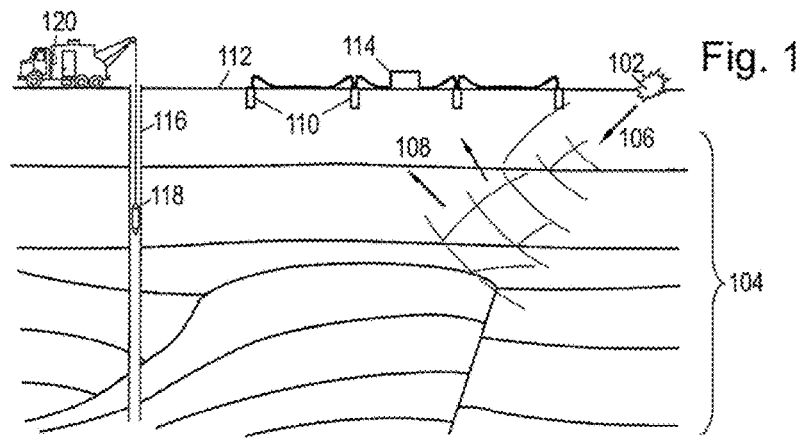
FIG. 1 is a schematic depiction of an illustrative seismic survey.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

To put the disclosed well placement systems and methods in context, it is useful to understand how seismic maps are created and used. It all begins with a seismic survey, which can be performed on land or in water. As indicated in FIG. 1, an energy source 102 near the region of interest 104 generates seismic waves 106 that propagate into the subsurface and reflect from internal features such as bed boundaries. Eventually the reflected waves 108 reach an array of receivers 110 on the surface 112. A recording system 114 captures the received signals for storage and processing. The process is repeated with many different source and receiver positions.

FIG. 1 further shows the use of logging facility 120 to convey one or more logging tools 118 along a borehole 116 in the region of interest 104 and to collect measurements of formation properties that are accurate, but localized to the immediate vicinity of the borehole 116. Contemplated logging tools include: a sonic logging tool that measures at each position along the borehole the propagation velocities of compressional waves ("P-waves") and shear waves ("S-waves"); a density logging tool that measures the bulk density of the formation at each position along the borehole; and a microfracture testing tool.

Microfacture testing is a known, commercially available technique that enables direct, in-situ measurement of closure stress. Typically, a formation testing tool is lowered as part of a wireline or tubing-conveyed tool assembly into an uncased borehole. The tool inflates two packers that are spaced about one meter apart to seal against the borehole wall and thereby isolate the annular space between the packers. The tool accurately measures the pressure in this space and continues monitoring the pressure during a sequence of injection cycles.

Illustrative flow rate and pressure graphs are shown in FIGS. 9A-9B. FIG. 9A shows two injection cycles 902, 904, each involving injection of fluid at a fixed rate (e.g., 5-10 milliliters/sec) intended to cause fracture initiation and/or propagation. FIG. 9B shows that during the first injection cycle 902, the pressure rises linearly until the formation breakdown pressure is reached at 906, initiating a fracture and causing a sharp drop to level 908, the pressure at which the fracture propagates. Once the fracture opens, injection continues for another 500-1000 milliliters to ensure stable propagation is occurring. The injection 902 is then halted and followed by a shut-in interval that permits the annular pressure to decay. The pressure falls sharply until the fracture closes at 910, then decays more gradually thereafter, converging to the pore pressure of the formation. Once the pore pressure has been estimate, the tool initiates a bleed-down at 912, returning the annular region to the initial hydrostatic pressure 914 before another injection cycle is initiated.

FIGS. 9A and 9B further illustrate a second injection cycle 904. The initial curve has a different shape because the previously-initiate fracture re-opens at a pressure 916 below the formation breakdown pressure 906. Nevertheless, the measurements of the propagation pressure 908 and closure pressure 918 can be repeated. In this fashion, the shape of the microfracture testing pressure curve reveals break down pressure, fracture propagation pressure, instantaneous shut-in pressure, closure pressure, and pore pressure. The tool may repeat the injection/falloff cycles until it determines that the minimum in-situ stress measurement has been made with high confidence, i.e., in a dependable and repeatable fashion. As a consequence, the required testing time for one interval may require several hours. Hence microfracture testing may be performed more judiciously that other logging measurements and used to measures the minimum in-situ stress only at selected positions within the intervals of interest (those regions contemplated as potential completion zones and neighboring regions that may serve as barriers to fracture propagation).

Though defined differently, the minimum in-situ stress, the minimum horizontal stress, and the closure stress are generally equal to each other. Though the direction of the minimum in-situ stress technically need not be horizontal, the weight of the overlying rock layers prevents it from assuming any significant vertical component at depth. The closure stress is measured as the pressure at which an open fracture effectively closes, a condition that is detectable as a change in the slope of a pressure profile. Since fractures generally open and propagate perpendicular to the direction of minimum in-situ stress, this closure pressure equals the minimum in-situ stress.

Figure 2:
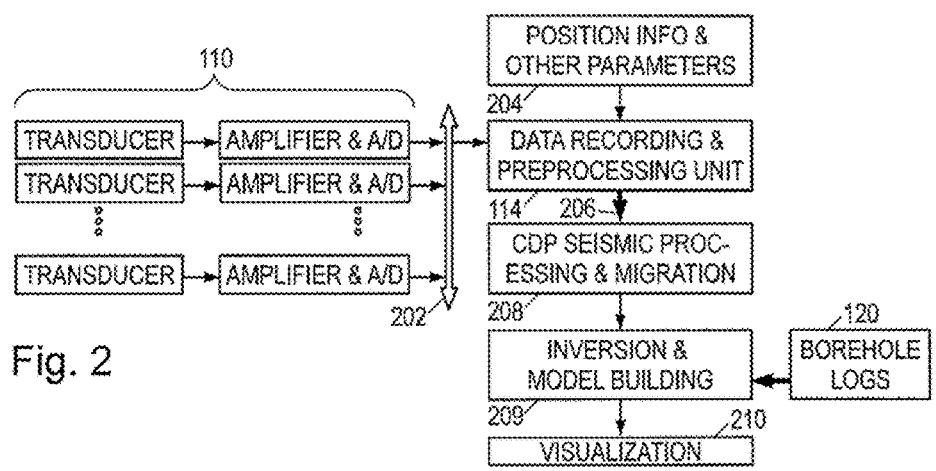
FIG. 2 is a block diagram of an illustrative seismic survey system that generates a landing map.
Figure 3:
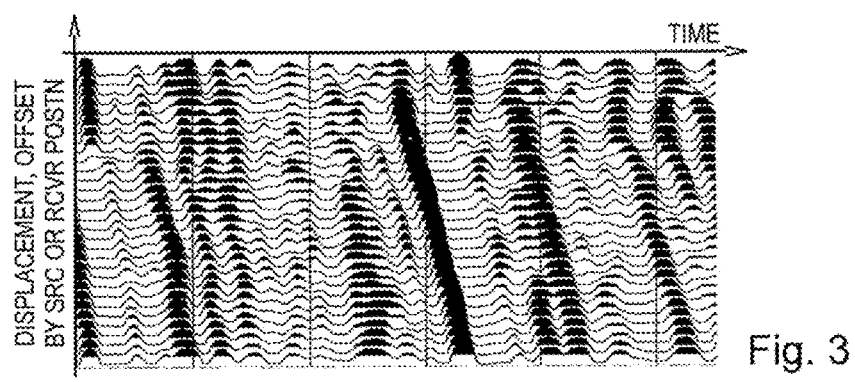
FIG. 3 is a graph of illustrative received signal traces.

As indicated in FIG. 2, the array of seismic receivers 110 converts the seismic waves to electrical signals that are amplified and digitized. (Illustrative signal waveforms are shown in FIG. 3.) A recording system 114 collects the digitized signals via a bus 202 or other communications pathway and stores the digitized signals on an information storage medium for later processing. Typically, each digitized signal is associated with parameters 204 such as a receiver location and a shot location and such other information as the system designer deems worthwhile. Recording system 114 may perform some initial processing to filter and/or compress the data, and in at least some cases, to perform quality control.

The recording system 114 provides the storage and transcription of the seismic survey data to a portable media 206 for delivery to a data processing center having sufficient computational resources for performing standard CDP (common depth point) seismic processing and migration 208. Such processing includes reorganizing the traces into gathers, filtering, and near-surface corrections. The computers in the data processing center may further employ a series of processing algorithms to perform inversion 209 and construct a three dimensional representation of the subsurface structure which can be displayed on a monitor 210 and stored in persistent storage for later use. The formation properties or other attributes of the map may be calibrated to match the borehole logs provided from the logging facility 120.

As shown in FIG. 4A, a seismic interpreter employs a user interface 402 of a workstation 404 to view and analyze the seismic model. The workstation 404 is part of the hardware platform of a subsurface modeling system such as that shown in FIG. 4B. The illustrative hardware platform couples the workstation 404 to one or more multi-processor computers 406 via a local area network (LAN) 405. The one or more multi-processor computers 406 are in turn coupled via a storage area network (SAN) 408 to one or more shared storage units 410. Using the personal workstation 404, the seismic interpreter is able to load seismic survey data into the system, map subsurface intervals of interest, and calculate attributes and to retrieve the results from the system, optionally in the form of attribute maps. The seismic interpreter may further load borehole logs and data from other sources to aid in the processing of the survey data and the interpretation of the resulting maps.

Personal workstation 404 may take the form of a desktop computer with a display that shows graphical representations of the input and result data, and with a keyboard that enables the user to move files and execute processing software. LAN 405 provides high-speed communication between multi-processor computers 406 and with personal workstation 404. The LAN 405 may take the form of an Ethernet network.

Multi-processor computer(s) 406 provide parallel processing capability to enable suitably prompt processing of the input data to derive the results data. Each computer 406 includes multiple processors 412, distributed memory 414, an internal bus 416, a SAN interface 418, and a LAN interface 420. Each processor 412 operates on allocated tasks to solve a portion of the overall problem and contribute to at least a portion of the overall results. Associated with each processor 412 is a distributed memory module 414 that stores application software and a working data set for the processor's use. Internal bus 416 provides inter-processor communication and communication to the SAN or LAN networks via the corresponding interfaces 418, 420. Communication between processors in different computers 406 can be provided by LAN 405.

SAN 408 provides high-speed access to shared storage devices 410. The SAN 408 may take the form of, e.g., a Fibrechannel or Infiniband network. Shared storage units 410 may be large, stand-alone information storage units that employ magnetic disk media for nonvolatile data storage. To improve data access speed and reliability, the shared storage units 410 may be configured as a redundant disk array ("RAID").

It is the software that configures the hardware platform to operate as a well placement systems using closure stress based landing maps. FIG. 4C represents the hardware platform as functional blocks, with data source 470 representing the persistent storage systems 408, 410, and processor unit 472 representing a composite of the workstation 404 and multi-processor computers 406 interconnected via LAN 405. Various software modules 473-477 are shown as resident on the composite processing unit 472. The mapping of software modules to memories, cores, and other components of the hardware platform is a task efficiently handled by the operating system's built in scheduler process. The allocated module tasks may be executed in a serial and parallel fashion to carry out the methods and processes disclosed herein.

Inversion module 473 operates on the seismic survey data, applying those operations necessary to derive a three dimensional map of the subsurface attributes, including the spatial distribution of attributes such as seismic wave velocities and acoustic impedances. CSS module 474 operates on the seismic-based attributes to derive a seismic-based CSS attribute as a function of position in the subsurface volume. Other derived attributes can also be determined in a similar fashion. Calibration module 475 modifies the seismic-based CSS attribute map to match with information obtained from borehole logs. Landing module 476 processes the calibrated CSS map alone or together with other attributes to derive a landing map that highlights desirable completion zones. Display module presents the seismic images and/or attribute maps in an interactive fashion on the user interface 402. Additional modules may be included for storing the image and derived attribute maps on a nonvolatile data storage device 470 for use in subsequent operations.

The modules may be implemented by one or more proprietary or commercially available software packages installed on the hardware platform to facilitate the desired functionality. User-authored scripts, workflows, or other programming mechanisms may be employed to customize the operation of the software and automate certain operations such as those outlined below for well (completion zone) placement. Examples of commercially available software that supports the use of such user programming include Paradigm's GOCAD software, which supports the use of TCL ("Tool Command Language") or CLI ("Command Language Interface), and Schlumberger's Petrel software, which includes a Process Manager for authoring workflows. Both software packages support the use of plug-ins that can be authored in traditional programming languages such as C++. Nevertheless, the implementation of the following methods is not limited to any specific software language or execution environment.

As part of the inversion processing properties for each layer can be refined and augmented with further analysis, which may include processing to extract velocity, dispersion, and angular dependence of the wave field propagation. Using the data processing center, the seismic interpreter models the region of interest as a three-dimensional space 502 divided into regular or irregular grid of cells 504 as illustrated in FIG. 5. The properties of all of the points within a cell are assumed to be uniform. Typically, the inversion process yields for each cell some measure of an attribute within an interval of interest. Additional sources of information (such as well logs, simulations, and stratigraphic interpretation) may also be exploited to measure, extrapolate, or otherwise estimate properties of each cell.

The individual attribute cells 504 in space 502 can each be assigned an opacity and color based on their associated attribute values. Often, the attribute values associated with regions of less interest, e.g., regions having low resistivity, low porosity, or other indicators of low hydrocarbon content, will be rendered transparent to make the regions of interest more readily visible.

One technique for assigning opacity and color is illustrated in FIG. 6, which is a cross-plot. Each point corresponds to the combination of attribute values associated with a cell. (In practice, the cross-plot may have more than the two dimensions shown here.) Typically, the points tend to form clusters representing the different types of rock and formation fluids present in the subsurface volume. Those clusters or areas of the cross-plot that are associated with regions of interest, such as desirable completion zones, may be selected and assigned distinctive visual characteristics, such as color and opacity.

For example, if Attribute 1 represents hydrocarbon concentration (a product of total porosity with hydrocarbon saturation) and Attribute 2 represents a minimum in-situ stress, the upper right quadrant may represent attribute value combinations associated with desirable completion zones. The cells having attribute values falling with region 602 may be assigned 80% opacity and a red hue, while cells having attribute values in the penumbral region 604 may be assigned a 50% opacity and a yellow hue. The cells having attribute values outside this region may be assigned 0% opacity. When the cells 504 are rendered in this fashion, the space may appear somewhat as shown in FIG. 7.

In FIG. 7, the bulk of the landing map 702 is rendered as transparent, with one opaque region 704 and two semi-opaque regions 706, 708, representing other potential regions of interest. Color may be used in addition to opacity to highlight the desirability of completing a well in each region. In FIG. 7, for example, the more opaque region 704 may represent a higher desirability (due to lower closure stress and higher hydrocarbon saturation) than less opaque regions 706, 708, with color of region 704 varying from green to yellow to red to indicate subregions having increasingly higher desirability.

FIG. 7 further shows a derrick 712 with a directionally-drilled well that reaches a completion zone placement 710 within desirable landing region 704. Subject to predetermined restrictions on pad placement and wellbore trajectories, the placement of one or more wells may be performed by the computer in an optimized fashion that accounts for completion zone desirability. Alternatively, the placement may be performed manually by the seismic interpreter, or may be performed in a cooperative fashion (e.g., with the interpreter guiding the overall arrangement of boreholes while permitting the computer to adjust placement in a locally-optimized fashion).

FIG. 8 is a flow diagram of an illustrative well placement method that may be embodied as a user-authored script, workflow, program, plugin, or other executable unit and implemented by the system of FIGS. 4A-4C. The various blocks may represent individual software modules, though in some embodiments multiple blocks may be implemented as a single module.

In block 802, the system establishes access to seismic survey data, including the traces, that have been obtained with a seismic survey. Typically, the survey data is stored in a database on nonvolatile storage. In block 804, the system performs common depth point (CDP) seismic processing and migration. Such processing includes grouping the traces into gathers, filtering, and applying corrections for near-surface effects.

In block 810, the system applies an AVO (Amplitude Versus Offset or Amplitude Variation with Offset) inversion process to the gathers to derive, for each cell in the subsurface volume, seismic attributes such as P-wave impedance, S-wave impedance, density, and the velocities of the P- and S-type waves. For details on this Hampson-Russell inversion process, see Goodway, B., et al (2010) "Seismic petrophysical and isotropic-anisotropic AVO methods for unconventional gas exploration", The Leading Edge, December 2010 pp. 1500-1508, which is hereby incorporated herein by reference. Software for implementing this Hampson-Russell inversion process is also available commercially from CGG Veritas.

In block 814, the system establishes access to core sample data and/or borehole logs that have been obtained from one or more boreholes in the region of interest. Contemplated logs include sonic logging tool measurements of P-wave and S-wave velocities, density logging tool measurements of bulk density, and microfracture testing tool measurements of the minimum in-situ stress. (P-wave and S-wave impedance can be calculated from the combination of velocity and density measurements.) Similar measurements may also or alternatively be made on core samples extracted from the boreholes.

In block 816, the system calculates borehole-measurement based values of CSS. In one approach, these CSS values are calculated from $\lambda\rho$, and $\mu\rho$. $\lambda$ is the first Lame parameter related to the bulk modulus ($\kappa$) and the shear modulus ($\mu$) by $\kappa=\lambda^{2/3}\mu$. $\rho$ is the bulk density. The calculated values can be determined as:

$$\lambda\rho = I_p^2 - 2I_s^2 \quad (1)$$

$$\mu\rho = I_s^2 \quad (2)$$

$$CSS = \frac{\lambda}{\lambda + 2\mu} = \frac{I_p^2 - 2I_s^2}{I_p^2} \quad (3)$$

where $I_p$ and $I_s$ are the P-wave and S-wave impedances, respectively.

Alternatively, the CSS values are calculated from Poisson's Ratio (PR), which is the negative of the ratio between a material's transverse and axial strains. The CSS values can be calculated as:

$$CSS = \frac{PR}{(1-PR)} \quad (4)$$

In block 818, the system relates the borehole-based CSS values to the obtained closure stress measurements. In theory, the values follow the relationship:

$$Px = CSS \cdot Po + (1-CSS) \cdot Pp \cdot \alpha \quad (5)$$

where Px is the minimum horizontal stress, Po is the overburden stress, Pp is the pore pressure, and a is a dimensionless constant that accounts for lithology. Pore pressure can be measured by the same microfracturing tests that are used to measure the closure stress. Overburden stress is readily calculated from a vertical integral of the measured densities of formation materials above the measurement point.

The determination of the actual relationship may be accomplished by cross-plotting the closure stress measurements Px with the calculated CSS values and finding the line that best fits the plot. (A more accurate relationship can be determined by also accounting for the pore pressure.) In at least one embodiment, the system performs the necessary calculations to determine the best fit without actually representing the cross-plot graphically.

In block 820, the system calculates seismic-measurement based values of CSS, optionally using the measurements of P-wave and S-wave impedance obtained from block 810, but otherwise employing the equations (1)-(3) or (4) as set forth above for block 816. As previously mentioned, seismic measurements encompass larger subsurface volumes than borehole measurements, but may not be as quantitatively accurate. Accordingly, the system employs the borehole-based CSS values to calibrate the seismic-based CSS values, rescaling the seismic-based values as needed to achieve a substantial match with the borehole-based values.

In block 822, the system takes the relationship between CSS and closure stress from block 818 and applies it to the calibrated CSS values to obtain closure-stress values Px throughout the subsurface volume of interest. The applying of the relationship preferably also accounts for changes in overburden stress and pore pressure as expressed in equation (5). That is, increases in depth will increase the overburden stress, which in turn increases the horizontal minimum stress. The overburden stress is computed by integrating the density log from the surface down to the target depth. The pore pressure can be acquired from an offset well mud weight data.

As an example, assuming a constant pore pressure in a region of interest, a CSS value of 0.2 might translate into a closure stress of 5293 psi at a depth of 9050 feet while also translating to a closure stress of 5987 psi at a depth of 10,130 feet.

As these closure-stress values are derived from direct in-situ measurements, they are expected to be significantly more accurate predictors of well performance. These values are accordingly used in block 824 to create the CSS-based landing map. The closure-stress values are used in combination with one or more other attributes to create the CSS-based landing map. At least one of these other attribute values are preferably indicative of hydrocarbon volume. Examples of such other attribute values include resistivity, porosity, and hydrocarbon saturation. As outlined previously, the attributes may be cross-plotted to highlight areas representing those combinations of attribute values representing a desirable completion zone, e.g., low closure stress together with high hydrocarbon-filled porosity. "Low" and "high" are relative terms that are expected to vary based on previous experiences with the reservoir and similar reservoirs, but nevertheless should be clear to those of ordinary skill as thresholds that can be adjusted to highlight those regions presenting the best opportunities for completing a productive well. In at least some contemplated embodiments, the thresholds may be set in a percentile fashion, e.g., "low" may represent values below the 20$^{th}$ percentile of closure stress values, while "high" may represent values above the 80$^{th}$ percentile of porosity values.

In block 826, the system displays a visual representation of the landing map and/or stores the landing map for later use. In block 828, the system may, subject to restrictions on spacing, orientation, and number of completion zones, automatically optimize the placement of the completion zones in the highlighted areas of the landing map. Alternatively, or in addition, the seismic interpreter may interact with the system to select and modify the placement of completion zones.

Though the selected placements may initially serve as targets for the driller, errors and/or new information may cause the actual borehole trajectories to deviate from the targets. The drillers may employ the landing map as a guide for steering the remainder of the borehole trajectories and selecting new completion zones.

Many of the operations set forth in FIG. 8 are parallelizable and need not be performed in sequence or, in some cases, need not be performed in the order shown. Numerous other variations and modifications will become apparent to those skilled in the art once the above disclosure is fully appreciated. It is intended that the following claims be interpreted to embrace all such variations and modifications.

What is claimed is:

1. A computer-based well placement method that comprises:
   (a) accessing a seismic survey of a subsurface region with a computer;
   (b) processing the seismic survey with the computer to get an attribute map of the subsurface region, wherein the attribute map represents at least a spatial distribution of a seismic-based closure stress scalar (CSS);
   (c) using the computer to access logs from one or more boreholes in the subsurface region, the logs including at least microfracture testing and sonic logs;
   (d) deriving from the logs a relationship between a borehole-based CSS and a minimum in-situ stress;
   (e) calibrating the attribute map to match the borehole-based CSS, thereby obtaining a calibrated CSS map;
   (f) cross-plotting minimum in-situ stress values based on the calibrated CSS map with another attribute value to provide a cross-plot;
   (g) classifying regions of the cross-plot as representing desirable completion zones;
   (h) mapping the subsurface region using color to highlight areas associated with said regions of the cross-plot to provide a landing map;
   (i) using the landing map to accurately place one or more wells in the desirable completion zones; and
   (j) drilling one or more wells employing the accurately placed one or more wells as a guide.

2. The method of claim 1, wherein the logs include measurements of p-wave velocity, s-wave velocity, and density.

3. The method of claim 1, wherein said logs include microfracture test-based measurements of minimum in-situ stress.

4. The method of claim 3, wherein said deriving includes:
   (d1) determining acoustic impedances for p-waves and s-waves;
   (d2) calculating the borehole-based CSS from said acoustic impedances.

5. The method of claim 1, wherein the desirable completion zones are areas associated with relatively low values of minimum in-situ stress and relatively high values of porosity.

6. A system for modeling a subsurface region, the system comprising:
   a memory having a well placement software module; and
   one or more processors coupled to the memory to execute the following modules:
   a CSS module that derives an attribute map of the subsurface region, wherein the attribute map represents at least a spatial distribution of a seismic-based closure stress scalar (CSS);
   a calibration module deriving from core samples or logs acquired in one or more boreholes in the subsurface region a relationship between a borehole-based CSS and a minimum in-situ stress; and calibrating the attribute map to match the borehole-based CSS, thereby obtaining a calibrated CSS map;
   a landing module that cross-plots minimum in-situ stress values based on the calibrated CSS map with another attribute value to provide a cross-plot; classifies regions of the cross-plot as representing desirable completion zones; and maps the subsurface region using color to highlight areas associated with said regions of the cross-plot; and
   a module automatically determining placements for one or more wells in the desirable completion zones, or alternatively or in addition permitting a user to interact with the system to select and modify placements for one or more wells.

7. The system of claim 6, further comprising a display module causing the one or more processors to display a visual representation of the landing map with said well placements.

8. The system of claim 6, wherein the CSS module processes a seismic survey of the subsurface region to estimate P-wave impedance and S-wave impedance.

9. The system of claim 6, wherein said calibration module:
   determines acoustic impedances for p-waves and s-waves; and
   calculates the borehole-based CSS from said acoustic impedances.

10. The system of claim 9, wherein said logs include at least microfracture testing measurements of minimum in-situ stress, sonic tool measurements of P-wave velocity and S-wave velocity, and density tool measurements of density.

11. The system of claim 6, wherein the landing module:
    maps the subsurface region using color to highlight areas associated with relatively low values of minimum in-situ stress and relatively high values of porosity.

12. A computer-based well placement method that comprises:
    (a) accessing a seismic survey of a subsurface region with a computer;
    (b) processing the seismic survey with the computer to get an attribute map of the subsurface region, wherein the attribute map represents at least a spatial distribution of a seismic-based closure stress scalar (CSS);
    (c) using the computer to access measurements of core samples from one or more boreholes in the subsurface region, the measurements including at least minimum in-situ stress, P-wave acoustic impedance, and S-wave acoustic impedance;
    (d) deriving from measurements a relationship between a borehole-based CSS and minimum in-situ stress;
    (e) calibrating the attribute map to match the borehole-based CSS, thereby obtaining a calibrated CSS map;
    (f) cross-plotting minimum in-situ stress values based on the calibrated CSS map with another attribute value to provide a cross-plot;
    (g) classifying regions of the cross-plot as representing desirable completion zones;
    (h) mapping the subsurface region using color to highlight areas associated with said regions of the cross-plot to provide a landing map;
    (i) accurately placing one or more wells in the desirable completion zones; and (j) drilling one or more wells employing the accurately placed one or more wells as a guide.

13. The method of claim 12, wherein said deriving includes:
   (d1) calculating the borehole-based CSS from said acoustic impedances; and
   (d2) fitting a linear dependence of minimum in-situ stress to the borehole-based CSS.

14. The method of claim 12, wherein the desirable completion zones are areas associated with relatively low values of minimum in-situ stress and relatively high values of porosity.

* * * * *